Oct. 18, 1955  A. L. JONES ET AL  2,720,975
THERMAL DIFFUSION APPARATUS
Filed Feb. 27, 1952  2 Sheets-Sheet 1
FIG.1.
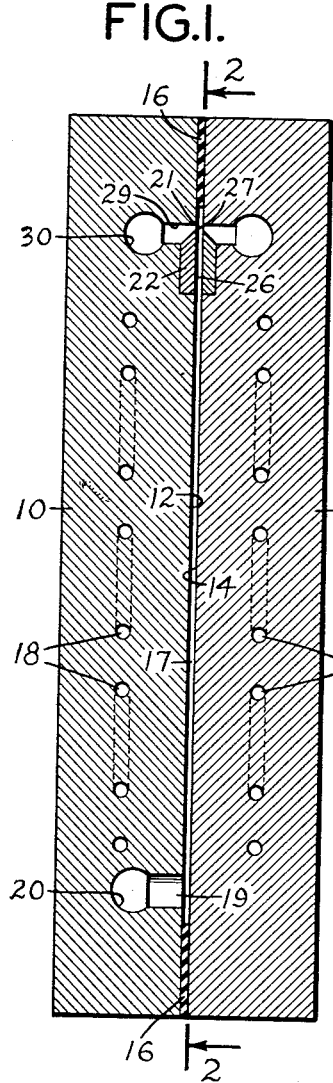
FIG.2.
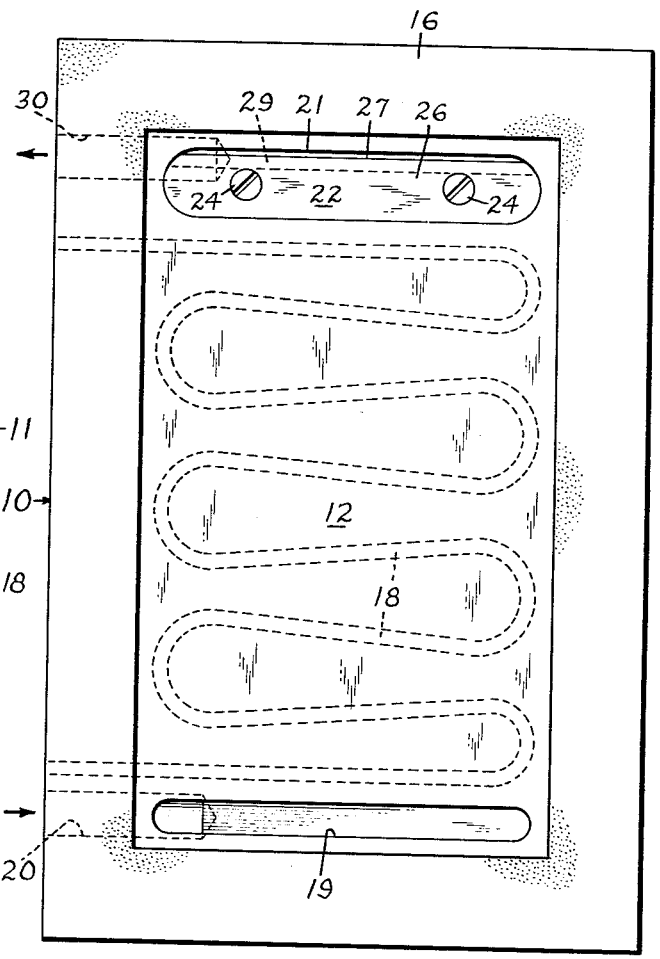
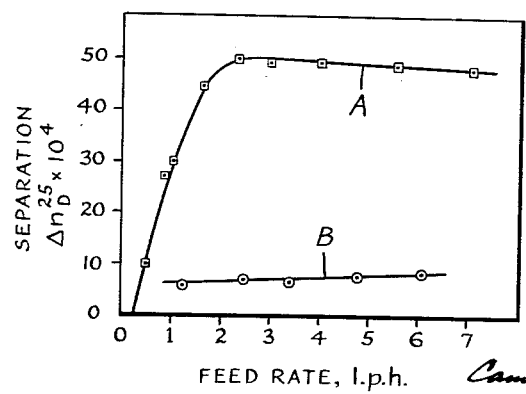
FIG.3.
INVENTORS.
ARTHUR LETCHER JONES
CHARLES W. SEELBACH
DAVID FRAZIER
BY
Campbell, Brumbaugh, Free & Graves
THEIR ATTORNEYS.

Oct. 18, 1955    A. L. JONES ET AL    2,720,975
THERMAL DIFFUSION APPARATUS
Filed Feb. 27, 1952                                 2 Sheets-Sheet 2
FIG. 4
FIG. 5
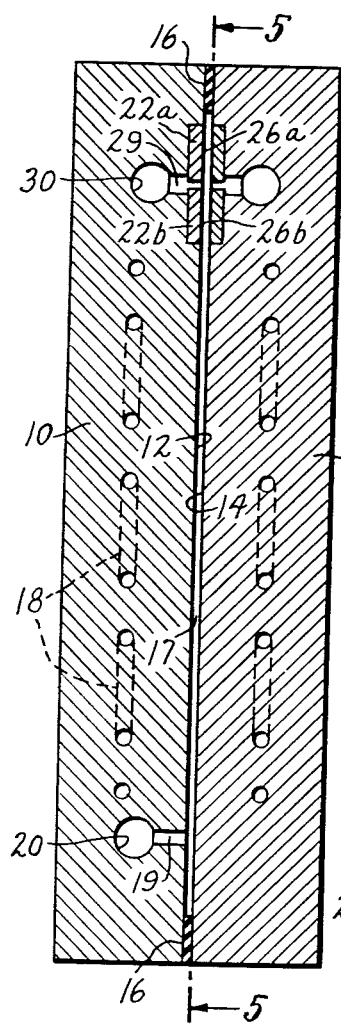
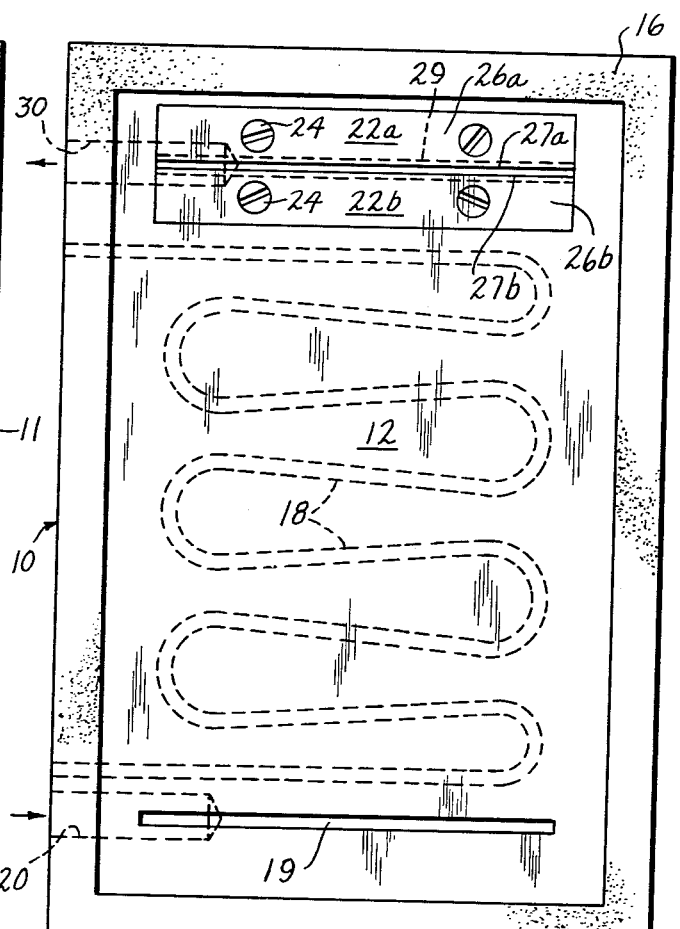
INVENTORS.
ARTHUR LETCHER JONES
CHARLES W. SEELBACH
DAVID FRAZIER
BY
Campbell, Brumbaugh, Free & Graves
THEIR ATTORNEYS

United States Patent Office 2,720,975
Patented Oct. 18, 1955

2,720,975

THERMAL DIFFUSION APPARATUS

Arthur Letcher Jones, Lyndhurst, Charles W. Seelbach, Euclid, and David Frazier, South Euclid, Ohio, assignors to The Standard Oil Company, Cleveland, Ohio, a corporation of Ohio Application February 27, 1952, Serial No. 273,737

10 Claims. (Cl. 210—52.5)

The present invention relates to a new and useful improvement in apparatus for separating liquid mixtures by continuous thermal diffusion.

It has been known for some time that it is possible to separate liquid mixtures into two or more dissimilar fractions by subjecting a thin film of liquid mixture to a temperature gradient. For many years this was accomplished in apparatus consisting essentially of two closely spaced, parallel walls forming a narrow slit and provided at each end of the slit with a reservoir having a volume considerably in excess of the volume of the slit. By filling such an apparatus with a liquid mixture and maintaining the opposed walls at different temperatures, the liquid in one reservoir becomes enriched in one component of the liquid mixture, and the liquid in the other reservoir becomes impoverished in said component, or enriched in another component. After many hours or several days, the liquids in the two reservoirs are separately withdrawn.

The amount of liquid that can be subjected to thermal diffusion in apparatus of this type is extremely small, being measured in tens of ccs., and the time and heat energy required is so great that the technique of separating liquid mixtures by thermal diffusion remained nothing more than a laboratory curiosity for some eighty years.

More recently it has been proposed, e. g., in Patents 2,541,069–071, to subject liquid mixtures to thermal diffusion by maintaining a temperature gradient across a narrow slit formed by closely spaced concentric or flat walls, and continuously passing a stream of the liquid mixture through the slit. It was found that by such means the rate of separation obtainable is much improved.

The slit widths of liquid thermal diffusion columns are extremely narrow, i. e., less than about 0.15" and desirably not more than about 0.06". When continuous liquid thermal diffusion is carried out in apparatus designed for concurrent flow, i. e., where the liquid mixture to be subjected to thermal diffusion is introduced at one portion of a vertical, horizontal or inclined slit, and the dissimilar fractions are withdrawn from adjacent the hot and cold walls, respectively, at one end of the slit, remote from the point of introduction, there is, theoretically, no limit to the minimum slit width due to the absence of endwise thermal circulation within the slit. For practical considerations, however, the minimum slit width for concurrent flow is of the order of about 0.01".

There is reason to believe that the withdrawal of dissimilar fractions of a liquid mixture from a thermal diffusion column, particularly when they move through the slit concurrently, causes sufficient turbulence to bring about a rather considerable remixing, immediately prior to withdrawal, of the fractions separated within the slit. The end result of this is that the degree of separation in the two withdrawn fractions is less than the degree of separation actually obtained within the slit, i. e., the efficiency of withdrawal is not commensurate with the efficiency of separation by thermal diffusion.

The present invention is addressed particularly to improving the efficiency with which fractions separated by thermal diffusion within a column can separately be withdrawn from the column.

The improvement with which the present invention is concerned is an improved form of withdrawal port which comprises essentially an elongated opening in the face of one of the walls, said opening having a longitudinal axis transversely of the direction of flow of liquid within the slit, and a passage for liquid extending from the opening to the exterior of the apparatus. The passage is preferably divided into a flow-equalizing portion substantially coextensive with the opening and a portion extending from the flow equalizing portion to the exterior of the apparatus. To promote a substantially uniform rate of flow of liquid through all portions of the opening, the passage, particularly the flow-equalizing portion thereof, is sufficiently large in volumetric proportions in relation to the volumetric flow capacity of the opening to assure substantially uniform flow through all parts of the opening. The volumetric proportions of the liquid passage should not, however, be so large in relation to the volumetric capacity of the slit as to delay unduly the displacement from the liquid passage of unseparated liquid mixture with which the passage is initially filled upon commencement of the liquid thermal diffusion process, or hold up any more than necessary of the separated fraction during the continual operation. The passage may be tapered to assist in uniform withdrawal, especially if the volumetric proportions are relatively small.

The elongated opening may be formed in any suitable manner. It may be integral with one of the walls, e. g., formed by sawing or the like, or it may be built in by providing a groove in the face of the wall and fitting into the groove one or more elongated strip members spaced from one another or from one or both edges of the groove to form one or more narrow elongated openings. The edge or edges of the elongated strip member or members forming the opening or openings may be flat or beveled. Thus, for example, in one preferred embodiment described more fully with reference to the accompanying drawing, a withdrawal port is formed by an elongated groove in the face of one of the walls forming the thermal diffusion slit, one of the two edges of the groove forming a substantially square shoulder with the wall face and an elongated strip member is fitted in the groove, one face of the strip member being in substantially the same plane as the wall face and one edge of the strip member being beveled to form a knife edge lengthwise of the strip member. The knife edge of the strip member is adjacent the substantially square shoulder formed by the groove and spaced therefrom a substantially uniform distance along its entire length to form the opening. The space formed under the beveled edge serves as a flow-equalizing portion of a passage for liquid that extends to the exterior of the apparatus.

The width of the opening should be substantially uniform along its entire length and should range between a practical minimum of about 0.005" and a maximum approximately equal to the slit width, i. e., the spacing between the opposed walls forming the slit. For optimum efficiency, the width of the opening should be less than approximately one-half the slit width.

One of the primary advantages of the withdrawal port of this invention is that it increases enormously the efficiency, probably due to a minimization of turbulence, with which fractions separated within a thermal diffusion slit can actually be removed from the slit.

This and other advantages, as well as the utility of the invention, will become further apparent from the following detail description made with reference to the accompanying drawing, wherein:

Figure 1 is a cross-sectional view of a liquid thermal diffusion apparatus provided with two withdrawal ports illustrative of the invention;

Figure 2 is a cross-sectional view taken along section line 2—2 of Figure 1;

Figure 3 is a graph demonstrating the superior efficiency of take-off ports constructed in accordance with this invention as compared with that of a groove type take-off ports; and Figures 4 and 5 are views, similar to Figures 1 and 2, of a liquid thermal diffusion apparatus having outlets constructed in accordance with another embodiment of the invention.

Referring now to Figures 1 and 2 illustrating schematically a liquid thermal diffusion apparatus utilizing two withdrawal ports constructed in accordance with the present invention, the opposed walls 10 and 11 having wall faces 12 and 14, respectively, are substantially parallel, liquid impervious and stationary. The wall faces 12 and 14 are separated from one another a distance of less than about 0.15", desirably not more than 0.06" and preferably from about 0.01 to about 0.035" apart by one or more gaskets 16 to form a narrow slit 17. The walls 10 and 11 may be maintained in their position relative to one another by any suitable means, such as bolts extending through the walls and the gasket or gaskets adjacent the edges thereof and may be maintained at different temperatures by any suitable means such as circulation of fluids through coils indicated at 18. The apparatus illustrated in Figures 1 and 2 is provided with an inlet port comprising an elongated groove 19 in the face 12 of the wall 10 and a passage 20 through which the liquid mixture can be introduced from outside the apparatus by any suitable means and to the slit 17 by way of groove 19.

The apparatus illustrated by way of example in Figures 1 and 2 is provided, at the end of the slit 17 remote from the inlet port 19, 20, with two withdrawal ports, one in wall 10 and the other in wall 11. The withdrawal port in wall 10, for example, comprises an elongated groove, preferably having an L-shaped cross section as shown, in the face 12, at least one edge of the groove forming a substantially square shoulder 21 with the wall face 12. An elongated strip member 22 is secured in the groove by any suitable means such as screws 24, the face 26 of the strip member 22 being in substantially the same plane as the wall face 12. One edge of the strip member 22 is beveled to form a knife edge 27 lengthwise of the strip member, the knife edge being adjacent the square shoulder 21 and substantially uniformly spaced therefrom to form a narrow, elongated opening having a width ranging from about 0.005" to a distance approximately equal to the width of the slit 17. The elongated space or flow-equalizing portion 29 of a passage for liquid in the groove under the beveled edge of the strip member 22 communicates with a passage portion 30 extending to the exterior of the wall 10.

The apparatus illustrated by way of example in Figures 4 and 5 is substantially similar to that illustrated in Figures 1 and 2. The outlets, however, are formed by elongated grooves having a T-shape cross-section and two parallel elongated strip members 22a and 22b secured in the groove by any suitable means such as screws 24. The faces 26a and 26b of the strip members in the groove of the wall 10, for example, are in substantially the same plane as the wall face 12 and one edge 27a of the strip member 22a is adjacent and substantially uniformly spaced from an edge 27b of the strip member 22b. The gap between edges 27a and 27b communicates with the elongated space or flow-equalizing portion 29 of the passage for liquid in the groove which in turn communicates with a passage portion 30 extending to the exterior of the apparatus in substantially the same manner as described with reference to Figures 1 and 2.

A series of tests were run on apparatus essentially similar to that illustrated in Figures 1 and 2 wherein the width of the slit 17 was 0.035", the slit was in the vertical position shown, and the effective length and breadth of the slit were both 10". One wall was maintained at a temperature of 270° F. and the other was maintained at a temperature of 70° F. In one series of tests the two withdrawal ports were constructed as shown in the drawing, the thickness of the strip member 22 being one-eighth of an inch, the beveled angle thereof being 45°, and the spacing between the knife edge 27 and the shoulder 21 being 0.010".

In a comparative series of test runs all conditions were identical, except that instead of the withdrawal ports illustrated in Figures 1 and 2, grooves having a depth of one-eighth of an inch and a width of between two and three-sixteenths of an inch, connected by means of equally spaced holes in the bottom of the groove to a passage similar to passage 30 of the apparatus illustrated, but extending the entire length of the groove, were used.

In each test a 50/50 mixture of cetane and methylnaphthalene was fed into the column by way of inlet port 19, 20 at various rates of flow, and fractions from adjacent the hot and cold walls, respectively, were withdrawn through the oppositely disposed withdrawal ports at equal rates. To measure the degree of separation obtained at each instance, the indices of refraction at 25° C. of the two fractions were obtained, the difference in indices of refraction between the hot wall product and the cold wall product being an accurate indicator of the extent to which separation took place.

The results of these tests are illustrated in the graph of Figure 3, wherein the curve A represents the degree of separation, in terms of difference between the indices of refraction of the hot wall and cold wall products obtained with the thermal diffusion column having the withdrawal ports of this invention, and curve B represents the degree of separation, expressed similarly, obtained under identical conditions but with a simple groove type of withdrawal port. These curves reveal that with the withdrawal ports of the present invention, the degree of separation rises rapidly as the feed rate is increased to about 2 liters per hour and remains practically level at higher feed rates, whereas with the simple groove type withdrawal ports the degree of separation is less than one-fifth as great at feed rates ranging from about 1 to 6 liters per hour.

The degree of separation that takes place within a thermal diffusion slit is determined, for any given liquid mixture, by such conditions as temperature gradient, slit width, wall surface area and residence time of the liquid, all of which were the same in the comparative tests. It is self-evident, therefore, that the results obtained in these tests are indicative of the great superiority of the withdrawal ports of this invention over the groove type of withdrawal port. The withdrawal ports of this invention make it possible to separate physically the fractions concentrated adjacent the hot and cold walls within the thermal diffusion slit with far greater efficiency than has heretofore been possible.

It is to be understood that various changes and modifications will readily occur to those skilled in the art upon reading this description. All such changes and modifications are intended to be included within the scope of the invention as defined in the appended claims.

We claim:

1. Liquid thermal diffusion apparatus comprising two substantially parallel, liquid impervious, stationary walls, the opposed faces of which are smooth and spaced apart a distance less than about 0.15" to form a substantially uniform narrow slit, an inlet communicating with the slit and at least two outlets communicating with the slit, wherein at least one of the outlets is proivded with an elongated opening in the face of one of the walls, said opening having a longitudinal axis transversely of the direction of flow of liquid within the slit and having a width ranging from about 0.005" to a distance approximately equal to the slit width, and a passage for liquid extending from the opening to the exterior of the apparatus.

2. Liquid thermal diffusion apparatus comprising two substantially parallel, liquid impervious, stationary walls, the opposed faces of which are smooth and spaced apart a distance less than about 0.15" to form a substantially uniform narrow slit, an inlet communicating with the slit and at least two outlets communicating with the slit, wherein at least one of the outlets is provided with an elongated opening in the face of one of the walls, said opening having a longitudinal axis transversely of the direction of flow of liquid within the slit and having a width ranging from about 0.005" to a distance approximately equal to the slit width, and a passage for liquid extending to the exterior of the apparatus, one portion of said passage being substantially coextensive with the elongated opening and communicating therewith.

3. Liquid thermal diffusion apparatus comprising two substantially parallel, liquid impervious, stationary walls, the opposed faces of which are smooth and spaced apart a distance less than about 0.15" to form a substantially uniform narrow slit, an inlet communicating with the slit and at least two outlets communicating with the slit, wherein at least one of the outlets comprises an elongated groove in the face of one of the walls, said groove having a longitudinal axis transversely of the direction of flow of liquid within the slit; an elongated strip member in the groove forming an elongated opening lengthwise thereof, said opening having a width ranging from about 0.005" to a distance approximately equal to the slit width; and a passage for liquid extending to the exterior of the apparatus, one portion of said passage being under and substantially coextensive with the elongated strip member and communicating with the opening.

4. Liquid thermal diffusion apparatus comprising two substantially parallel, liquid-impervious stationary walls, the opposed faces of which are smooth and spaced apart a distance less than about 0.15 inch to form a substantially uniform narrow slit, an inlet communicating with the slit and at least two outlets communicating with the slit, wherein at least one of the outlets comprises an elongated groove in the face of one of the walls, at least one of the two edges of the groove forming a substantially square shoulder with said wall face; an elongated strip member in the groove, one face of the strip member being in substantially the same plane as the wall face, one edge of the strip member being beveled to form a knife edge lengthwise of the strip member, and the knife edge of the strip member being adjacent the substantially square shoulder formed by the groove and substantially uniformly spaced therefrom a distance ranging from about 0.005" to a distance approximately equal to the slit width; and a passage for liquid extending from the space in the groove under the beveled edge of the strip member to the exterior of the apparatus.

5. The apparatus defined in claim 4 wherein the slit forming walls are vertical and two withdrawal ports are disposed, one in each wall, at one end of the slit.

6. Liquid thermal diffusion apparatus comprising two substantially parallel, liquid-impervious, stationary walls, the opposed faces of which are smooth and spaced apart a distance less than about 0.15 inch to form a substantially uniform narrow slit, an inlet communicating with the slit and at least two outlets communicating with the slit, wherein at least one of the outlets comprises an elongated groove in the face of one of the walls; two parallel elongated strip members in the groove, one face of each strip member being in substantially the same plane as the wall face, one edge of one strip member being adjacent and substantially uniformly spaced from an edge of the other strip member a distance ranging from about 0.005 inch to a distance approximately equal to the slit width; and a passage for liquid extending from the space in the groove under the spaced edges of the strip members to the exterior of the apparatus.

7. Liquid thermal diffusion apparatus comprising two substantially parallel, liquid-impervious, stationary walls, the opposed faces of which are smooth and spaced apart a distance less than about 0.15" to form a substantially uniform narrow slit, wherein at least one of the walls is provided with an elongated opening in the face thereof, said opening having a longitudinal axis transversely of the direction of flow of liquid within the slit and having a width ranging from about 0.005" to a distance approximately equal to the slit width, and with a passage for liquid extending from the opening to the exterior of the apparatus.

8. The thermal diffusion apparatus set forth in claim 7, wherein said walls are substantially vertical.

9. The thermal diffusion apparatus set forth in claim 7, wherein said walls are substantially horizontal.

10. Liquid thermal diffusion apparatus comprising two substantially equidistantly spaced, liquid-impervious, stationary walls, the opposed faces of which are smooth and spaced apart a distance less than about 0.15 inch to form a substantially uniform narrow slit, wherein each of the walls is provided with an elongated opening in the face thereof, said openings being opposite to each other and each opening extending transverse to the direction of flow of liquid within the slit and having a width ranging from about 0.005 inch to a distance approximately equal to the slit width, and with a passage for liquid extending from the opening in the wall to the exterior of the apparatus.

References Cited in the file of this patent

UNITED STATES PATENTS

| | | |
|---|---|---|
| 2,161,785 | Lopez | June 13, 1939 |
| 2,185,785 | Dorr et al. | Jan. 2, 1940 |
| 2,521,112 | Beams | Sept. 5, 1950 |
| 2,541,069 | Jones et al. | Feb. 13, 1951 |
| 2,541,070 | Jones et al. | Feb. 13, 1951 |
| 2,541,071 | Jones et al. | Feb. 13, 1951 |
| 2,586,447 | Way | Feb. 19, 1952 |